US012489777B2

(12) United States Patent
Cooney

(10) Patent No.: US 12,489,777 B2
(45) Date of Patent: Dec. 2, 2025

(54) WEB APPLICATION SCAN UTILIZING MULTIPLE AUTHENTICATION TYPES BASED ON A SET OF USER CREDENTIALS

(71) Applicant: Tenable, Inc., Columbia, MD (US)

(72) Inventor: Fergus Cooney, Petawawa (CA)

(73) Assignee: Tenable, Inc., Columbia, MD (US)

( * ) Notice: Subject to any disclaimer, the term of this patent is extended or adjusted under 35 U.S.C. 154(b) by 478 days.

(21) Appl. No.: 18/168,743

(22) Filed: Feb. 14, 2023

(65) Prior Publication Data

US 2024/0275842 A1 Aug. 15, 2024

(51) Int. Cl.
*H04L 9/40* (2022.01)
(52) U.S. Cl.
CPC ...... *H04L 63/1433* (2013.01); *H04L 63/0807* (2013.01); *H04L 63/0823* (2013.01); *H04L 63/083* (2013.01)
(58) Field of Classification Search
None
See application file for complete search history.

(56) References Cited

U.S. PATENT DOCUMENTS

| | | | | |
|---|---|---|---|---|
| 7,467,402 | B2 * | 12/2008 | Pennington | ......... H04L 63/1433 726/5 |
| 8,341,711 | B1 * | 12/2012 | Pennington | ........... H04L 63/168 726/22 |
| 8,955,068 | B1 * | 2/2015 | Venkataramani | ....... H04L 63/08 713/182 |
| 9,300,643 | B1 * | 3/2016 | Doane | ..................... H04L 63/08 |
| 2020/0287928 | A1 * | 9/2020 | Murray | ................. G06F 21/577 |
| 2021/0319426 | A1 * | 10/2021 | DeSoto | ................. H04W 12/06 |
| 2024/0070287 | A1 * | 2/2024 | Cooney | ................. G06F 16/958 |
| 2024/0275842 | A1 * | 8/2024 | Cooney | ............... H04L 63/0807 |

FOREIGN PATENT DOCUMENTS

CN 104954331 A 9/2015

OTHER PUBLICATIONS

Rennhard et al., "Improving the effectiveness of web application vulnerability scanning", Publication Date: Jul. 2019; Published in: International Journal on Advances in Internet Technology.
Sirbu, C. "How to perform authenticated website scans with Pentest-Tools.com", Publication Date: Aug. 17, 2022; Published by: Pentest Tools.

* cited by examiner

*Primary Examiner* — Backhean Tiv
(74) *Attorney, Agent, or Firm* — MUNCY, GEISSLER, OLDS & LOWE, P.C.; Daniel Podhajny

(57) ABSTRACT

In an embodiment, a component of a web application scanner for scanning of a web application obtains a set of user credentials during a scan configuration session, the set of user credentials associated with a plurality of authentication types, and generates a first configuration associated with a first authentication type of the plurality of authentication types based on the set of user credentials. The component performs a first attempt to authenticate the web application scanner with the web application based on the first configuration. The component automatically and selectively performs a second attempt to authenticate the web application scanner using the set of credentials via a different authentication type based on whether the first attempt is verified as successful.

39 Claims, 10 Drawing Sheets

500

700

| SETTINGS | |
|---|---|
| AUTHENTICATION METHOD | |
| LOGIN FORM ⌄ | |
| LOGIN PAGE | |
| http:// ... | |
| CREDENTIALS | |
| Username | ... |
| Password | ... |
| Domain | ... |

⋮

WEB APPLICATION SCAN UTILIZING MULTIPLE AUTHENTICATION TYPES BASED ON A SET OF USER CREDENTIALS

TECHNICAL FIELD

The various aspects and embodiments described herein generally relate to web application scans utilizing multiple authentication types based on a set of user credentials.

BACKGROUND

Web applications can be an essential way to conduct business. Unfortunately, web applications can also be vulnerable to attacks (e.g., denial of service, disclosure of private information, network infiltration, etc.) due to their exposure to public Internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

Many web application scans are performed as "credentialed" scans, which rely upon user credential(s) for authentication in accordance with a predetermined (or preconfigured) authentication mechanism. Credentialed scans can perform a wider variety of checks than non-credentialed scans, which can result in more accurate scan results. Different credentials (or combinations of credentials) may be used for different authentication techniques. Some WAS scanners support managed credentials which store credential settings centrally in a credential manager. Credential settings to multiple scan configurations may be added instead of configuring credential settings for each individual scan.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of authenticating a web application scanner for scanning of a web application includes obtaining a set of user credentials during a scan configuration session, the set of user credentials associated with a plurality of authentication types; generating a first configuration associated with a first authentication type of the plurality of authentication types based on the set of user credentials; performing a first attempt to authenticate the web application scanner with the web application based on the first configuration; verifying whether the first attempt is successful; and automatically and selectively performing a second attempt to authenticate the web application scanner using the set of credentials via a different authentication type based on whether the first attempt is verified as successful.

In some aspects, attempts to authentication via the plurality of authentication types are performed in accordance with an authentication type execution order, until authentication is successful or each authentication type is attempted.

In some aspects, the authentication type execution order is preconfigured or is manually configured by a user.

In some aspects, the set of user credentials comprises: one or more first credentials associated with a Hypertext Transfer Protocol (HTTP) server authentication mechanism, one or more second credentials associated with a web application authentication mechanism, or one or more third credentials associated with a client certificate authentication mechanism, or a combination thereof.

In some aspects, the set of user credentials includes the one or more first credentials.

In some aspects, the one or more first credentials include a username, a password, a Kerberos domain, a Key Distribution Center (KDC), or a combination thereof.

In some aspects, the set of user credentials includes the one or more second credentials.

In some aspects, the one or more second credentials include a username, a password, a domain, a cookie, an application programming interface (API) key, one or more a Selenium side file, one or more Hypertext Transfer Protocol (HTTP) headers, or a combination thereof.

In some aspects, the set of user credentials includes the one or more third credentials.

In some aspects, the one or more third credentials include a client certificate, a client certificate private key, a client certificate private key passphrase, or a combination thereof.

In some aspects, the first configuration utilizes less than all user credentials among the set of user credentials.

In some aspects, the automatically and selectively performing comprises: determining that the first attempt is not verified as successful; generating a second configuration associated with a second authentication type of the plurality of authentication types based on the set of user credentials; performing a second attempt to authenticate the web application scanner with the web application based on the second configuration; and verifying whether the second attempt is successful.

In some aspects, the plurality of authentication types include: BASIC/DIGEST Hypertext Transfer Protocol (HTTP) server authentication, or Windows NT Local Area Network (LAN) Manager (NTLM) HTTP server authentication, or Kerberos HTTP server authentication, or login form web application authentication, or cookie web application authentication, or Selenium web application authentication, or application programming interface (API) key web application authentication, or bearer web application authentication, or client certificate authentication, or any combination thereof.

In an aspect, a component of a web application scanner for scanning of a web application includes a memory; and at least one processor communicatively coupled to the memory, the at least one processor configured to: obtain a set of user credentials during a scan configuration session, the set of user credentials associated with a plurality of authentication types; generate a first configuration associated with a first authentication type of the plurality of authentication types based on the set of user credentials; perform a first attempt to authenticate the web application scanner with the web application based on the first configuration; verify whether the first attempt is successful; and automatically and selectively performing a second attempt to authenticate the web application scanner using the set of credentials via a different authentication type based on whether the first attempt is verified as successful.

In some aspects, attempts to authentication via the plurality of authentication types are performed in accordance with an authentication type execution order, until authentication is successful or each authentication type is attempted.

In some aspects, the authentication type execution order is preconfigured or is manually configured by a user.

In some aspects, the set of user credentials comprises: one or more first credentials associated with a Hypertext Transfer Protocol (HTTP) server authentication mechanism, one or more second credentials associated with a web application authentication mechanism, or one or more third credentials associated with a client certificate authentication mechanism, or a combination thereof.

In some aspects, the set of user credentials includes the one or more first credentials.

In some aspects, the one or more first credentials include a username, a password, a Kerberos domain, a Key Distribution Center (KDC), or a combination thereof.

In some aspects, the set of user credentials includes the one or more second credentials.

In some aspects, the one or more second credentials include a username, a password, a domain, a cookie, an application programming interface (API) key, one or more a Selenium .side file, one or more Hypertext Transfer Protocol (HTTP) headers, or a combination thereof.

In some aspects, the set of user credentials includes the one or more third credentials.

In some aspects, the one or more third credentials include a client certificate, a client certificate private key, a client certificate private key passphrase, or a combination thereof.

In some aspects, the first configuration utilizes less than all user credentials among the set of user credentials.

In some aspects, the automatically and selectively performing comprises: determine that the first attempt is not verified as successful; generate a second configuration associated with a second authentication type of the plurality of authentication types based on the set of user credentials; perform a second attempt to authenticate the web application scanner with the web application based on the second configuration; and verify whether the second attempt is successful.

In some aspects, the plurality of authentication types include: BASIC/DIGEST Hypertext Transfer Protocol (HTTP) server authentication, or Windows NT Local Area Network (LAN) Manager (NTLM) HTTP server authentication, or Kerberos HTTP server authentication, or login form web application authentication, or cookie web application authentication, or Selenium web application authentication, or programming interface (API) key web application authentication, or web application authentication, or client certificate authentication, or any combination thereof.

In an aspect, a non-transitory computer-readable medium storing computer-executable instructions that, when executed by a component of a web application scanner for scanning of a web application, cause the component to: obtain a set of user credentials during a scan configuration session, the set of user credentials associated with a plurality of authentication types; generate a first configuration associated with a first authentication type of the plurality of authentication types based on the set of user credentials; perform a first attempt to authenticate the web application scanner with the web application based on the first configuration; verify whether the first attempt is successful; and automatically and selectively performing a second attempt to authenticate the web application scanner using the set of credentials via a different authentication type based on whether the first attempt is verified as successful.

In some aspects, attempts to authentication via the plurality of authentication types are performed in accordance with an authentication type execution order, until authentication is successful or each authentication type is attempted.

In some aspects, the authentication type execution order is preconfigured or is manually configured by a user.

In some aspects, the set of user credentials comprises: one or more first credentials associated with a Hypertext Transfer Protocol (HTTP) server authentication mechanism, one or more second credentials associated with a web application authentication mechanism, or one or more third credentials associated with a client certificate authentication mechanism, or a combination thereof.

In some aspects, the set of user credentials includes the one or more first credentials.

In some aspects, the one or more first credentials include a username, a password, a Kerberos domain, a Key Distribution Center (KDC), or a combination thereof.

In some aspects, the set of user credentials includes the one or more second credentials.

In some aspects, the one or more second credentials include a username, a password, a domain, a cookie, an application programming interface (API) key, one or more a Selenium side file, one or more Hypertext Transfer Protocol (HTTP) headers, or a combination thereof.

In some aspects, the set of user credentials includes the one or more third credentials.

In some aspects, the one or more third credentials include a client certificate, a client certificate private key, a client certificate private key passphrase, or a combination thereof.

In some aspects, the first configuration utilizes less than all user credentials among the set of user credentials.

In some aspects, the automatically and selectively performing comprises: determine that the first attempt is not verified as successful; generate a second configuration associated with a second authentication type of the plurality of authentication types based on the set of user credentials; perform a second attempt to authenticate the web application scanner with the web application based on the second configuration; and verify whether the second attempt is successful.

In some aspects, the plurality of authentication types include: BASIC/DIGEST Hypertext Transfer Protocol (HTTP) server authentication, or Windows NT Local Area Network (LAN) Manager (NTLM) HTTP server authentication, or Kerberos HTTP server authentication, or login form web application authentication, or cookie web application authentication, or Selenium web application authentication, or programming interface (API) key web application authentication, or web application authentication, or client certificate authentication, or any combination thereof.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
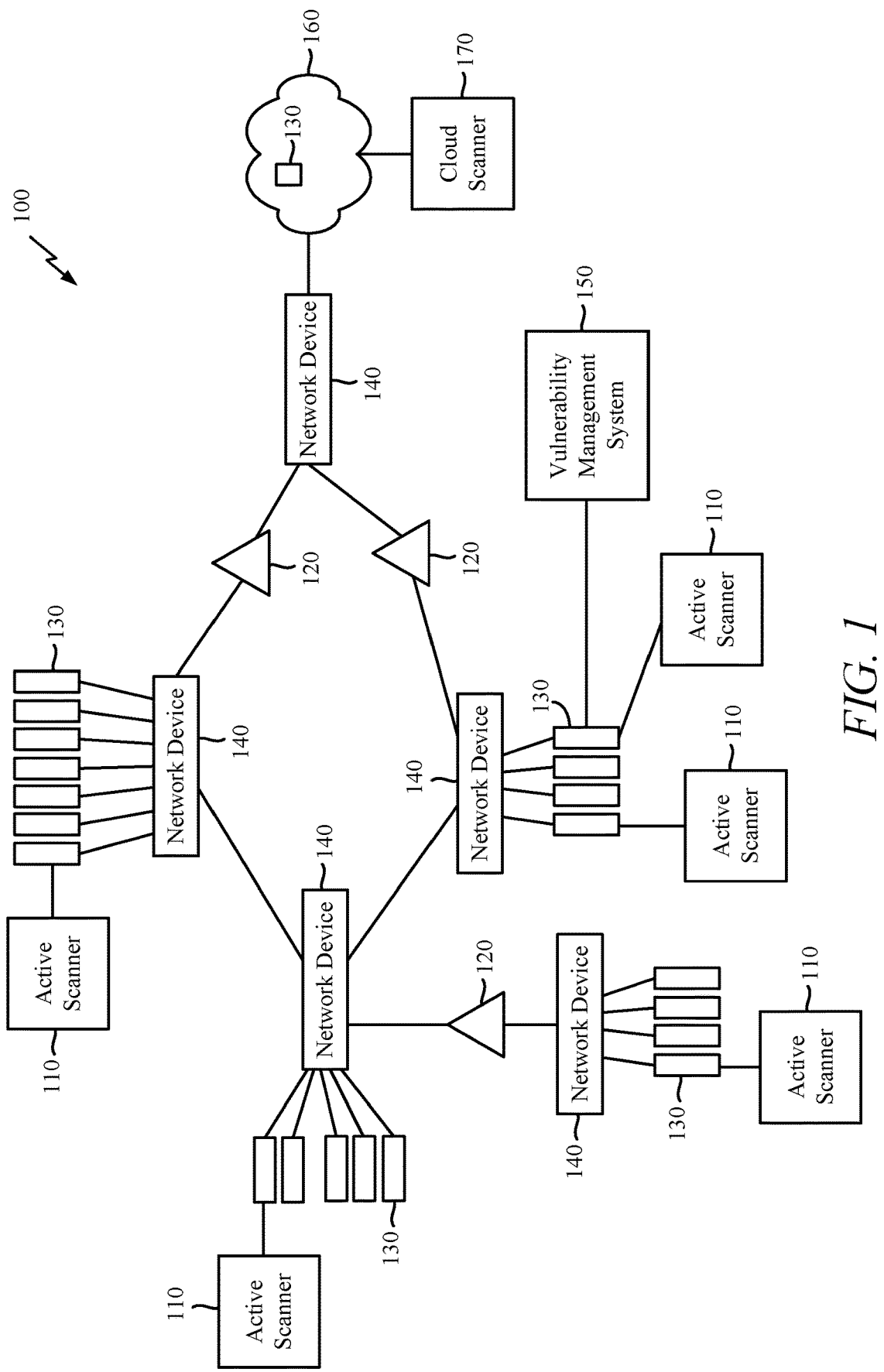
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
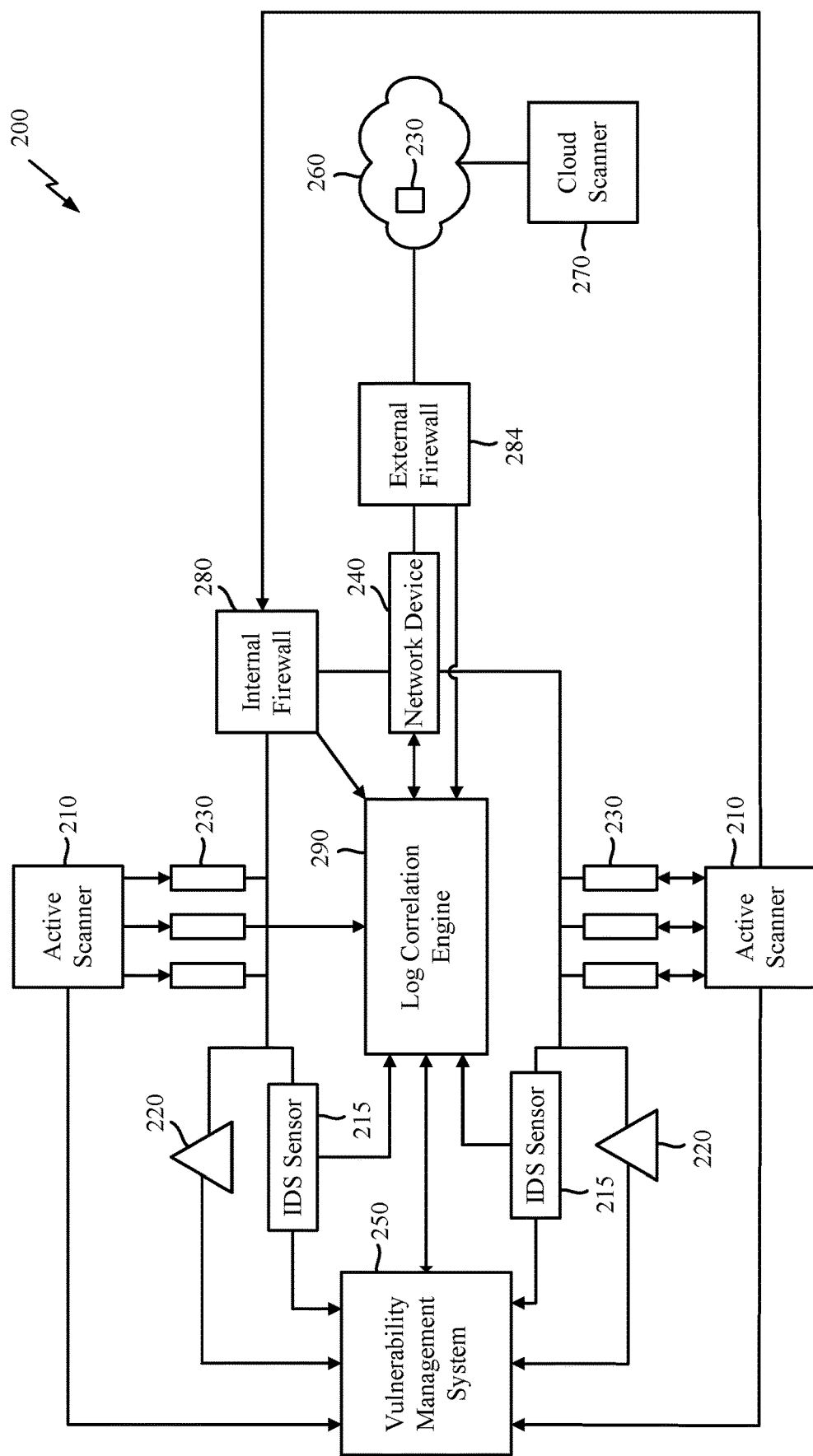
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

If there is more than one matching solution in the solution list, remove all but one of those solutions.
  For solutions matching "Upgrade to <product> x.y.z" where x, y, and z are integers, select a single result with the highest x.y.z value (comparing against x first, then y, then z).
  For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Web applications can be an essential way to conduct business. Unfortunately, web applications can also be vulnerable to attacks (e.g., denial of service, disclosure of private information, network infiltration, etc.) due to their exposure to public internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

WAS scans may take a relatively long time to perform, and many scans of redundant web pages or substantially redundant web pages may be performed. For example, a newly scanned web page may include only altered content (e.g., text, images, video, etc.) without any functional alterations, making that scan redundant.

When crawling a web application, a large number of web pages are discovered. Hence, deciding which of these web pages to audit via a security audit scan, and which will provide little to no benefit in auditing via the security audit scan, may help to reduce WAS scan times.

Figure 3:
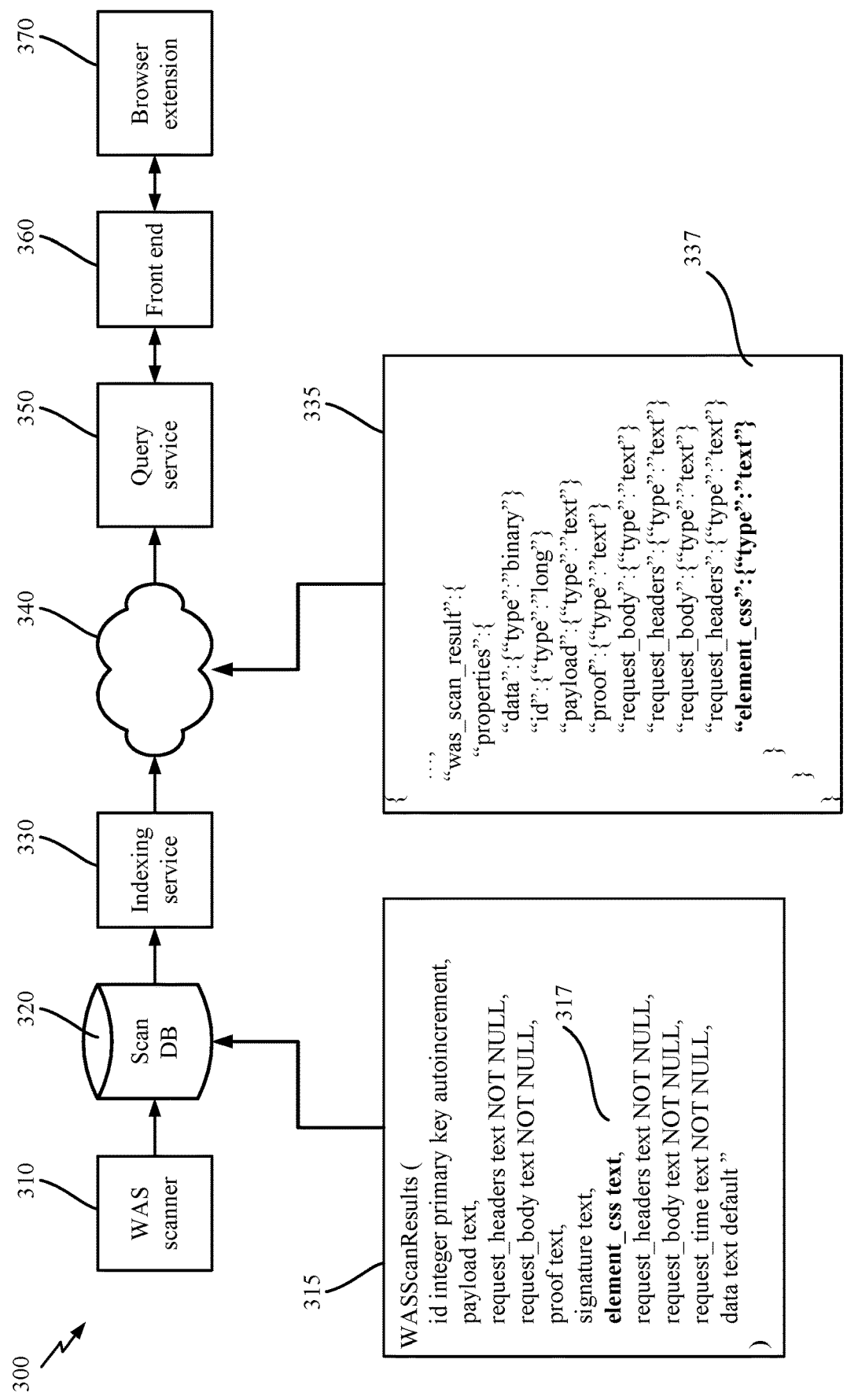
FIG. 3 illustrates a diagram of an example system suitable for interactive remediation of vulnerabilities of web applications based on scanning of web applications.

According to various aspects, FIG. 3 illustrates a diagram of an example system 300 suitable for interactive remediation of vulnerabilities of web applications based on scanning of web applications. In particular, as shown in FIG. 3, the system 300 may include a WAS scanner (or simply "scanner") 310, a scan results 320 (e.g., a database (DB)), a first cloud service 330, a search engine 340, a second cloud service 350, a front end 360, and a browser extension 370. The first and second cloud services 330, 350 may be a same cloud service or different cloud services.

Generally, the scanner 310 may include an element selector for the vulnerable element as a part of its result placed into the scan results 320. Examples (not necessarily exhaustive) of an element selector may include CSS selector, XPath selector, Node number selector, Name selector, Id selector, LinkText selector, and so on. This information may then be passed into the search engine 340 by the first cloud service 330 and included in results from the second cloud service 350 when queried for data about specific vulnerabilities, e.g., from the front end 360. If an element selector exists, the front end 360 (e.g., browser) may include a button that links back to the vulnerable URL and element.

The scanner 310 may be configured to scan web pages to identify one or more vulnerabilities of web applications, i.e., vulnerabilities of elements in web pages. In particular, the scanner 310 may include a selector (not shown) for the vulnerable element in the scan results 320. For example, the selector may implement a scanner function (selector create function) that will take the current element and produce an element selector from it. The URL the element appears on may be included as separate data. A final test may be run before including the data to ensure that the element can be gotten to or otherwise accessible without any extra browser steps that the system is unaware of. Such data may be kept in a table in the scan results 320. For example, a FIG. 3 illustrates a VulnerabilitiesDetected table 315, which includes a field for an element selector 317 denoted as "element_css", which is of text type.

The first cloud service 330 may be configured to index the search results within scan results 320. In particular, the first cloud service 330 may be configured to ensure that the field for the element selector 317 is included when the search engine 340 performs a search. In FIG. 3, it is seen the "was_scan_results" 335 data includes the element selector data 337, which is denoted as "element_css": {"type": "text" }.

The second cloud service 350 may be configured to query the search engine 340 for results of WAS scanning, e.g., performed by the scanner 310. In particular, the second cloud service 350 may be configured to query the search engine 340 for the element selector data 337. For example, the second cloud service 350 may submit the following query to pick up the element selector data 337 and return its response, e.g., to the front end 360.

GET/scans/{scanId}/hosts/{hostId}/plugins/{pluginId}

The front end 360 may be configured to receive the WAS scanning results data, including the element selector data for the vulnerable elements. The front end 360 may also be configured to include a button or some other visible element, which when activated (e.g., pressed by a user) will pass message to the browser extension 370 (e.g., chrome extension). The front end 360 may pass at least the following data in the message to the browser extension 370:

URL

Element selector

Plugin ID

The browser extension 370 may be configured to take the message passed from the front end 360, open the URL, and highlight and snap to the vulnerable element. In an aspect, the browser extension 370 may open the URL in a new tab of the browser.

Figure 4:
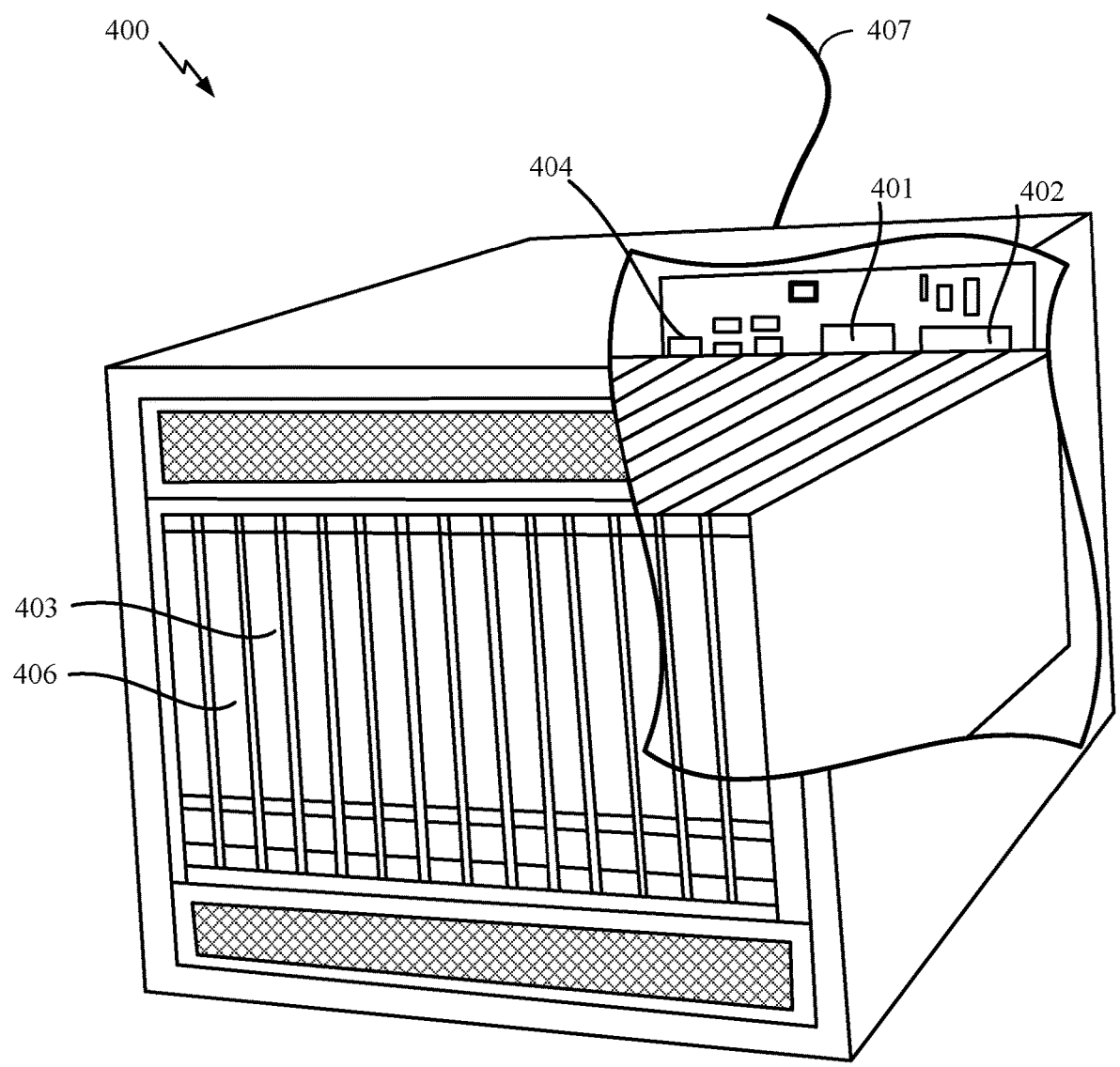
FIG. 4 illustrates a server, according to aspects of the disclosure.

The various embodiments may be implemented on any of a variety of commercially available server devices, such as server 400 illustrated in FIG. 4. In an example, the server 400 may correspond to one example configuration of a server on which a security auditing application may execute, which in certain implementations may be included as part of the vulnerability management system 150 of FIG. 1 or the vulnerability management system 250 of FIG. 2 or WAS scanner 300 of FIG. 3. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet.

Web applications can be an essential way to conduct business. Modern web applications continue to be a challenge for organizations to secure as developers build increasingly complex business applications faster than ever. Many organizations are releasing new or updated web applications multiple times per day, each containing multiple vulnerabilities on average. Often outnumbered by developers by 100:1, security teams are struggling to keep up, and many web applications are not assessed for security issues until it is too late. Lack of application security skills and resources inhibit many organizations from adequately defending against cyberthreats.

Hence, web applications can also be vulnerable to attacks (e.g., denial of service, disclosure of private information, network infiltration, etc.) due to their exposure to public Internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

Many web application scans are performed as "credentialed" scans, which rely upon user credential(s) for authentication in accordance with a predetermined (or preconfigured) authentication mechanism. Credentialed scans can perform a wider variety of checks than non-credentialed scans, which can result in more accurate scan results. Different credentials (or combinations of credentials) may be used for different authentication techniques. Some WAS scanners support managed credentials which store credential settings centrally in a credential manager. Credential settings to multiple scan configurations may be added instead of configuring credential settings for each individual scan.

In some designs, web application scans support credentials in one or more of the following well-known authentication types:

TABLE 1

| Credentials Category | Authentication Type |
| --- | --- |
| HTTP Server Authentication | Basic/Digest |
| | Windows NT Local Area Network (LAN) Manager (NTLM) |
| | Kerberos |
| Web Application Authentication | Login Form |
| | Cookie Authentication |
| | Selenium Authentication |
| | API Key |
| | Bearer Authentication |
| Client Certificate Authentication | — |

In some designs, to configure a credentialed WAS scan, a user first selects a credentials category, and then selects an authentication type if necessary (in case of client certificate authentication, the authentication type corresponds to the credentials category). Once the authentication type is selected, the user is prompted to enter the appropriate credentials (e.g., username and password, domain, cookie(s), client certificate(s), Kerberos Domain, Key Distribution Center (KDC), client certificate, client certificate private key, client certificate private key passphrase, etc., as well as non-credential information such as URL, page to verify successful authentication, pattern to verify successful authentication, etc.) for the selected authentication type. This permits the WAS scanner to authenticate itself on behalf of the user during the WAS scan.

Figure 5:
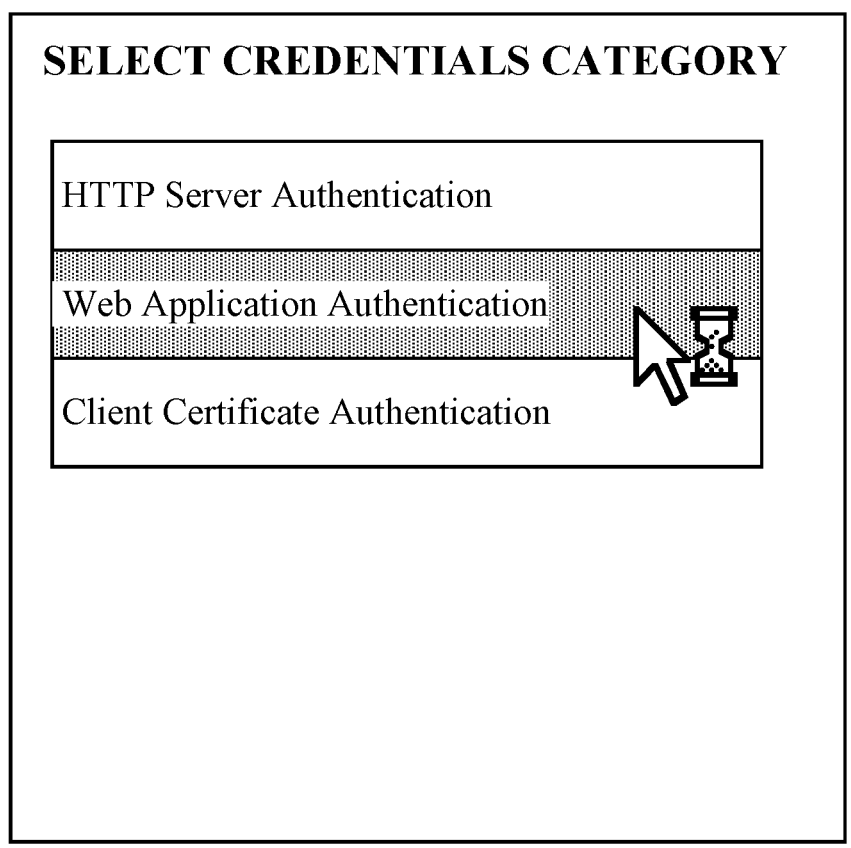
FIG. 5 illustrates an example credentials category prompt window, in accordance with aspects of the disclosure.

FIG. 5 illustrates an example credentials category prompt window 500, in accordance with aspects of the disclosure. In FIG. 5, the credentials category prompt window 500 prompts the user to select between HTTP server authentication, web application authentication and client certificate authentication. In this case, the user has selected web application authentication.

Figure 6:
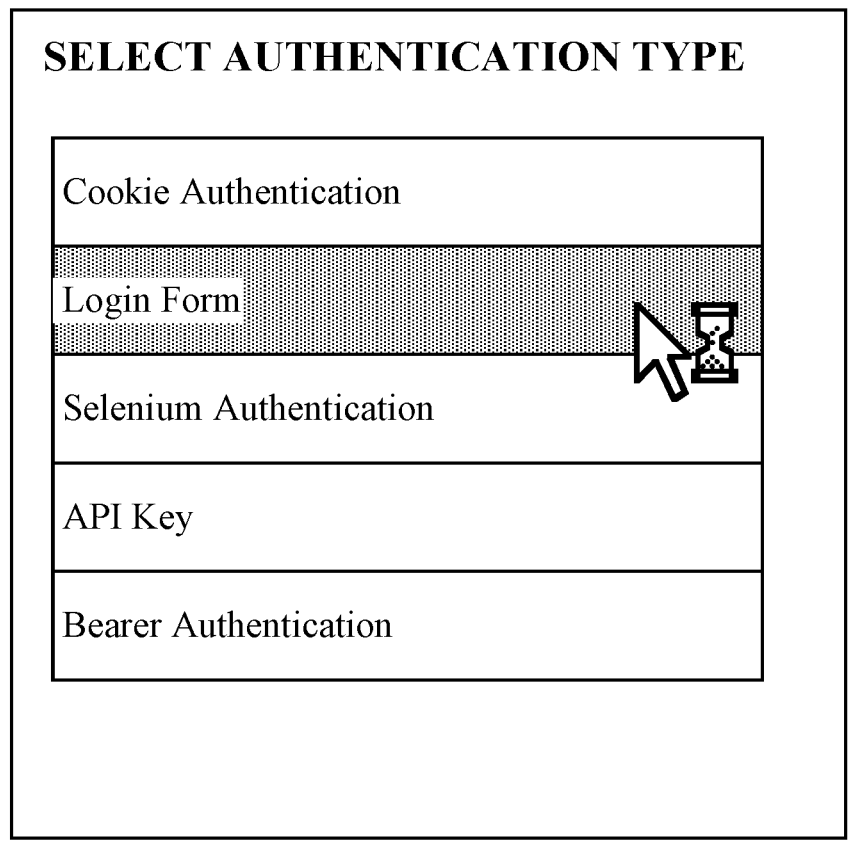
FIG. 6 illustrates an example authentication type prompt window, in accordance with aspects of the disclosure.

FIG. 6 illustrates an example authentication type prompt window 600, in accordance with aspects of the disclosure. In FIG. 6, the authentication type prompt window 600 prompts the user to select between a Cookie authentication type, a Login Form authentication type, a Selenium authentication type, an API key authentication type, and a Bearer authentication type. In this case, the user has selected the Login Form authentication type.

Figure 7:
FIG. 7 illustrates an example credentials prompt window, in accordance with aspects of the disclosure.

FIG. 7 illustrates an example credentials prompt window 700, in accordance with aspects of the disclosure. In FIG. 7, the credentials prompt window 700 prompts the user to enter the credentials appropriate for the selected authentication type; in this case, the Login Form authentication type. For example, the user is prompted to enter credentials such as username, password and domain. The user may also be prompted to enter non-credential information associated with the WAS scan, such as a URL of the web application to be scanned, active session verification information, and so on.

A problem associated with the above-noted approach is that users of web application scanners may not have expertise on the various authentication types that are available and/or knowledge of the authentication type(s) supported by a particular web application. Users of web application scanners may thereby be prompted with choices of authentication mechanisms that are not fully understood by those users. Some web browsers utilize user password managers that store user credentials (e.g., username/password) and scan web pages for fields where the stored user credentials can be populated automatically. However, in context with a web application scan, such password managers are limited (e.g., password managers may at best intercept response codes from a form submission to detect success/failure for a single authentication type, and may rely on limited authentication mechanism type options).

Aspects of the disclosure are thereby directed to obtaining a set of user credentials during a scan configuration session associated with a plurality of authentication types, instead of a single authentication type as in FIGS. 5-7. For example, such aspects may permit a user to provide their credentials (in bulk) without specific knowledge of the underlying authentication type(s) that use some or all of the provided credential(s). Such aspects may also provide technical advantages, such as faster scan times, because the user need not wait for a scan failure notification to then manually configure a scan using another authentication type.

Figure 8:
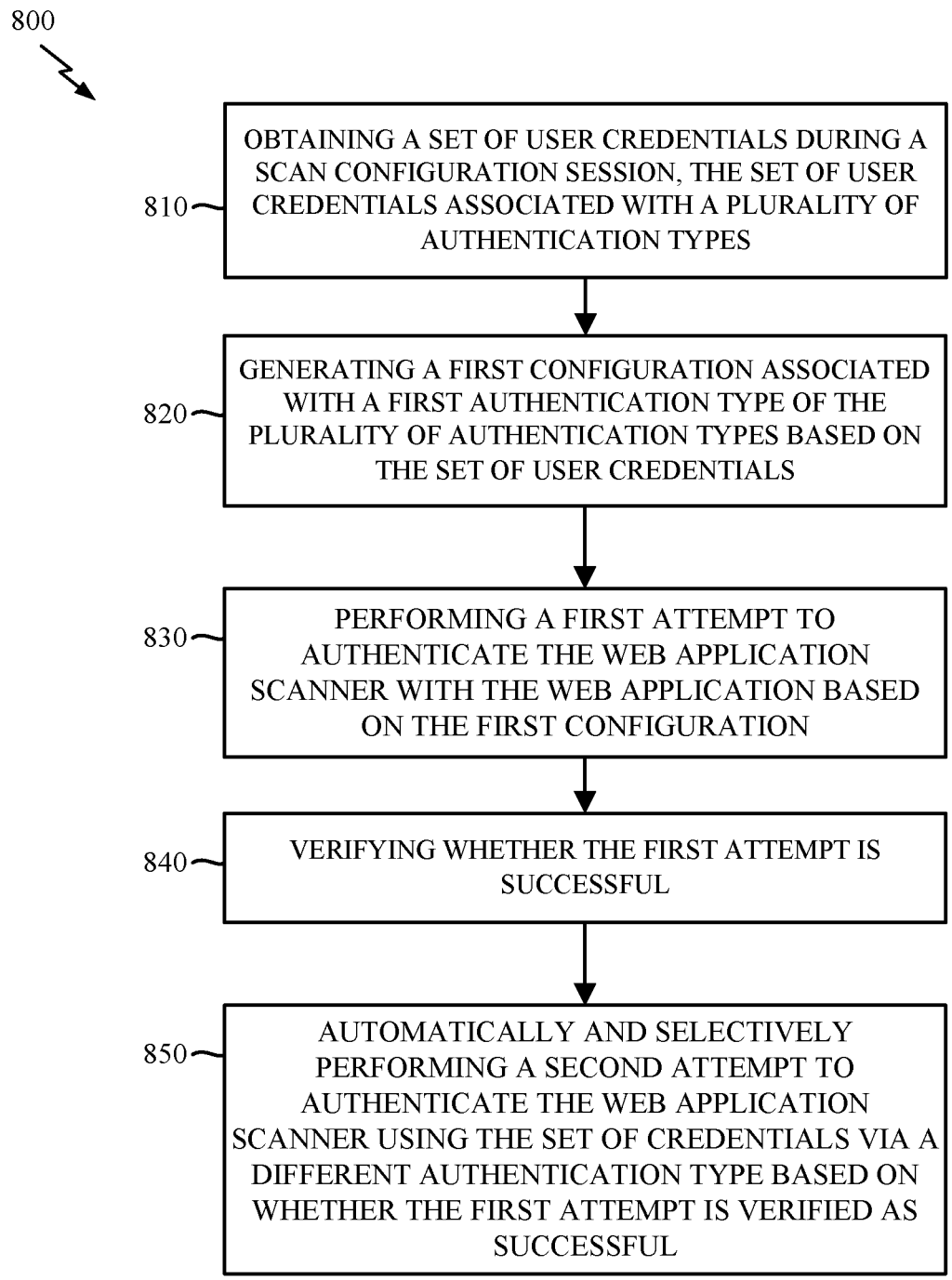
FIG. 8 illustrates a web scanning process, according to aspects of the disclosure.

FIG. 8 illustrates a web scanning process 800, according to aspects of the disclosure. The web scanning process 800 may be performed by a WAS component (also called a web application scanner), such as WAS scanner 310 of FIG. 3 or server 400 of FIG. 4. In other designs, the WAS component may be implemented as a user device or user equipment (UE) such as a laptop or desktop computer, a smart phone or tablet, etc.

At 810, the WAS component obtains a set of user credentials during a scan configuration session, the set of user credentials associated with a plurality of authentication types. In some designs, the user may be prompted to enter a number of credential types (e.g., in the same or different credential categories), and the user may fill in or upload the user credentials that he/she has access to (or knowledge of) without necessarily knowing or underlying the underlying authentication type with which the entered user credentialed are used. As noted above, such credentials may include username and password, domain, cookie(s), client certificate(s), Kerberos Domain, Key Distribution Center (KDC), client certificate, client certificate private key, client certificate private key passphrase, etc.

At 820, the WAS component generates a first configuration associated with a first authentication type of the plurality of authentication types based on the set of user credentials. In some designs, the first authentication type may be determined based on an authentication type execution order. In some designs, the authentication type execution order is default (or built into the WAS component decision logic). In other designs, the authentication type execution order (in full or in part) may be specified by the user. The first authentication generated at 820 may be the same (or similar to) a configuration that would have been generated by the WAS scanner had the user manually configured a configuration to conduct a scan using the first authentication type. In some designs, the WAS component may generate the first configuration only at 820, with other configuration(s) being generated if a first WAS scan attempt using the first configuration is unsuccessful. In other designs, the WAS component may generate N configurations using the set of user credentials at 820, with the N configurations being used for WAS scan attempts either iteratively (i.e., one after the other), in parallel, or some combination thereof (e.g., some groupings of configurations used for parallel scan attempts while other configurations performed iteratively).

At 830, the WAS component performs a first attempt to authenticate the web application scanner with a web application based on the first configuration. For example, the first attempt may involve the WAS component navigating to a URL of the web application and attempting to provide user credential(s) of the first configuration thereto (e.g., search the URL for username and password input fields, and if found, input username and password from the credentials into these fields and submitting).

At 840, the WAS component verifies whether the first attempt is successful. As noted above, password managers can be used to populate certain user credentials according to some authentication types. However, once those credentials are submitted, the password managers do not typically verify the success/failure of the authentication attempt.

At 850, the WAS component automatically and selectively performing a second attempt to authenticate the web application scanner using the set of user credentials via a different authentication type based on whether the first attempt is verified as successful. In other words, the user is not simply notified of a scan failure that resulted from the first configuration (which acts as a manual prompt for the user to attempt to scan the web application using a different configuration). Rather, the WAS component itself may refer back to the set of user credentials and use some or all of these credential(s) to attempt authentication using another authentication type.

Figure 9:
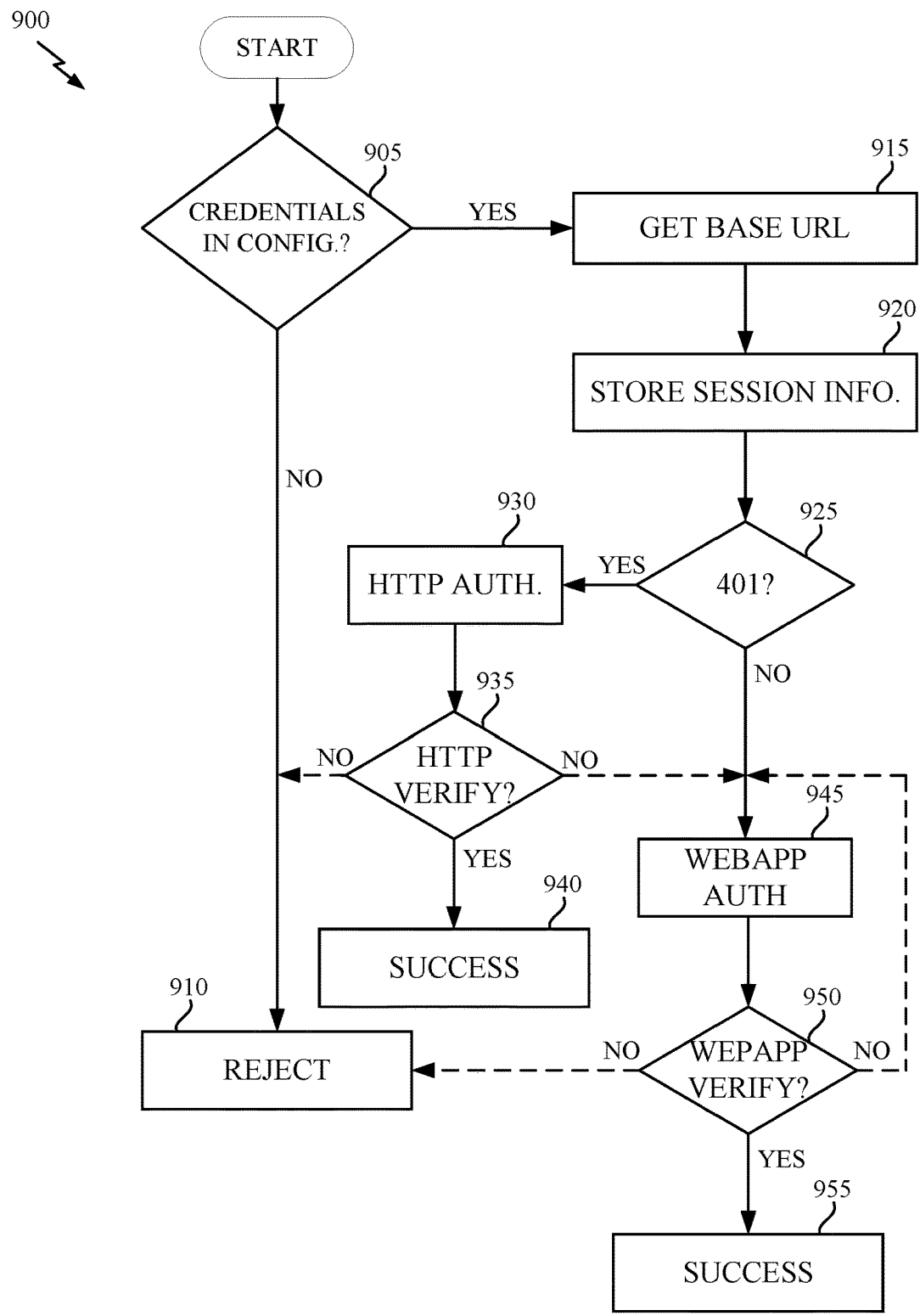
FIG. 9 illustrates an example implementation of FIG. 9, according to aspects of the disclosure.

FIG. 9 illustrates an example implementation 900 of FIG. 9, according to aspects of the disclosure.

Referring to FIG. 9, at 905, the WAS component determines if authentication credentials are set in a configuration for a WAS scan. If not, the WAS component returns REJECT at 910 (i.e., authentication unsuccessful). Otherwise, at 915, the WAS component initiates session with web application "GET BASE URL". At 920, the WAS component stores all session information. At 925, the WAS component examines a Response Code to the GET BASE URL from 915. If the Response Code is 401 (e.g., indicating support for a particular authentication type, such as HTTP Authentication Basic/Digest), then the process advances to 930 for HTTP Authentication. If the Response Code is not 401 (e.g., indicating a lack of support for HTTP Authentication Basic/Digest), then the process advances to 945 for Web Application Authentication.

At 930, the WAS component provides given credentials to HTTP Authentication Mechanism, and saves a response. The process then advances to HTTP VERIFY at 935. At 935, the WAS component compares new session data to earlier session data. If the new session data includes a new cookie, local storage or header with sufficient entropy (e.g., >80 bits), then the WAS component returns SUCCESS at 940 (i.e., authentication successful). If the new session data does not include a new cookie, local storage or header with sufficient entropy at 950, then the WAS component either returns REJECT at 910 (i.e., authentication unsuccessful) or the process advances to 945 (e.g., if one or more credentials for an alternative Web Application Authentications are available).

At 945, the WAS component opens a Login URL in browser from configuration. The WAS component examines the web page for inputs that fuzzy match to a username or password field. If detected, the WAS component enters credentials, and examines the web page for a login button or form. The WAS component submits the login credentials, and proceeds to WEBAPP VERIFY at 950. At 950, the WAS component compares new session data to earlier session data. If the new session data includes a new cookie, local storage or header with sufficient entropy (e.g., >80 bits), then the WAS component returns SUCCESS at 955 (i.e., authentication successful). If the new session data does not include a new cookie, local storage or header with sufficient entropy at 950, then the WAS component either returns REJECT at 910 (i.e., authentication unsuccessful) or the process returns to 945 (e.g., if one or more credentials for an alternative Web Application Authentications are available).

Referring to FIG. 8, in some designs as noted above, the WAS component may attempt authentication via the authentication via the plurality of authentication types in accordance with an authentication type execution order, until authentication is successful or each authentication type is attempted. In some designs, the authentication type execution order is preconfigured or is manually configured by a user.

Referring to FIG. 8, in some designs, the set of user credentials comprises: one or more first credentials associated with a Hypertext Transfer Protocol (HTTP) server authentication mechanism, one or more second credentials associated with a web application authentication mechanism, or one or more third credentials associated with a client certificate authentication mechanism. In some designs, the set of user credentials includes the one or more first credentials. In a specific example, the one or more first credentials include a username, a password, a Kerberos domain, a Key Distribution Center (KDC), or a combination thereof. In some designs, the set of user credentials includes the one or more second credentials. In a specific example, the one or more second credentials include a username, a password, a domain, a cookie, an application programming interface (API) key, one or more a Selenium .side file, one or more Hypertext Transfer Protocol (HTTP) headers, or a combination thereof. In some designs, the set of user credentials includes the one or more third credentials. In a specific example, the one or more third credentials include a client certificate, a client certificate private key, a client certificate private key passphrase, or a combination thereof.

Referring to FIG. 8, in some designs, the first configuration utilizes less than all user credentials among the set of user credentials.

Referring to FIG. 8, in some designs, the automatically and selectively performing comprises determining that the first attempt is not verified as successful, generating a second configuration associated with a second authentication type of the plurality of authentication types based on the set of user credentials, performing a second attempt to authenticate the web application scanner with the web application based on the second configuration, and verifying whether the second attempt is successful. If unsuccessful, this process may repeat any number of times, until authentication is successful or each authentication type is attempted.

Referring to FIG. 8, in some designs, the plurality of authentication types includes:

BASIC/DIGEST Hypertext Transfer Protocol (HTTP) server authentication, or

Windows NT Local Area Network (LAN) Manager (NTLM) HTTP server authentication, or Kerberos HTTP server authentication, or login form web application authentication, or cookie web application authentication, or Selenium web application authentication, or
application programming interface (API) key web application authentication, or
bearer web application authentication, or
client certificate authentication, or
any combination thereof.

Figure 10:
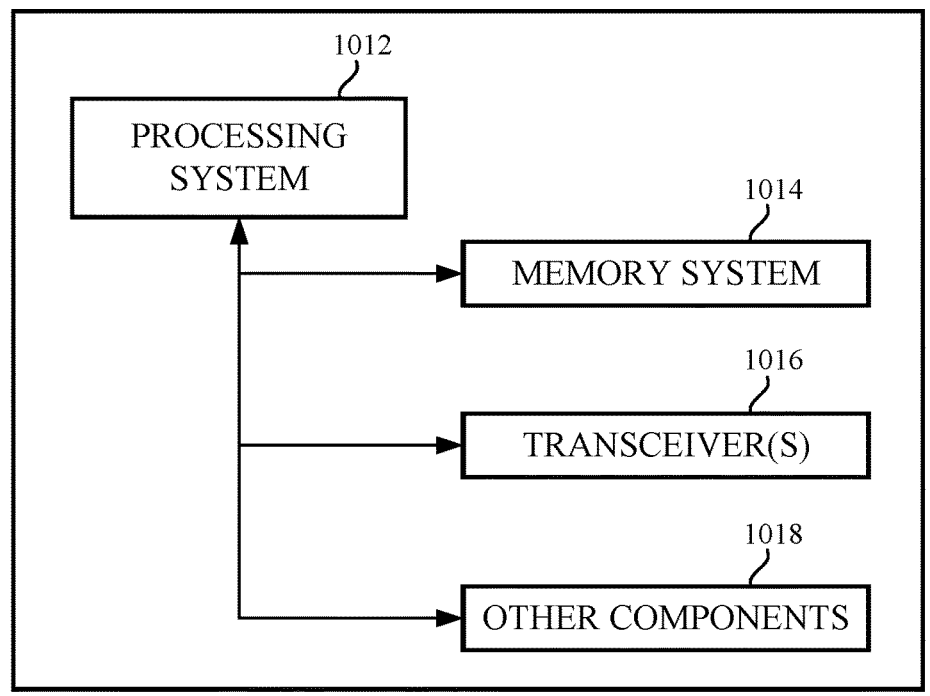
FIG. 10 generally illustrates a user equipment (UE) in accordance with aspects of the disclosure.

While FIG. 4 illustrates an example whereby a server-type apparatus 400 may implement various processes of the disclosure, such as the process of FIGS. 7 and 9-10, in other aspects the processes of FIGS. 7 and 9-10 in particular may execute on a user equipment (UE), such as UE 1010 depicted in FIG. 10.

FIG. 10 generally illustrates a UE 1010 in accordance with aspects of the disclosure. In some designs, UE 1010 may correspond to any UE-type that is capable of executing a WAS scanning application for performing any of the processes of FIGS. 7 and 9-10 as described above, including but not limited to a mobile phone or tablet computer, a laptop computer, a desktop computer, a wearable device (e.g., smart watch, etc.), and so on. The UE 1010 depicted in FIG. 10 includes a processing system 1012, a memory system 1014, and at least one transceiver 1016. The UE 1010 may optionally include other components 1018 (e.g., a graphics card, various communication ports, etc.).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of authenticating a web application scanner for scanning of a web application, comprising: obtaining a set of user credentials during a scan configuration session, the set of user credentials associated with a plurality of authentication types; generating a first configuration associated with a first authentication type of the plurality of authentication types based on the set of user credentials; performing a first attempt to authenticate the web application scanner with the web application based on the first configuration; verifying whether the first attempt is successful; and automatically and selectively performing a second attempt to authenticate the web application scanner using the set of credentials via a different authentication type based on whether the first attempt is verified as successful.

Clause 2. The method of clause 1, wherein attempts to authentication via the plurality of authentication types are performed in accordance with an authentication type execution order, until authentication is successful or each authentication type is attempted.

Clause 3. The method of clause 2, wherein the authentication type execution order is preconfigured or is manually configured by a user.

Clause 4. The method of any of clauses 1 to 3, wherein the set of user credentials comprises: one or more first credentials associated with a Hypertext Transfer Protocol (HTTP) server authentication mechanism, one or more second credentials associated with a web application authentication mechanism, or one or more third credentials associated with a client certificate authentication mechanism, or a combination thereof.

Clause 5. The method of clause 4, wherein the set of user credentials includes the one or more first credentials.

Clause 6. The method of clause 5, wherein the one or more first credentials include a username, a password, a Kerberos domain, a Key Distribution Center (KDC), or a combination thereof.

Clause 7. The method of any of clauses 4 to 6, wherein the set of user credentials includes the one or more second credentials.

Clause 8. The method of clause 7, wherein the one or more second credentials include a username, a password, a domain, a cookie, an application programming interface (API) key, one or more a Selenium .side file, one or more Hypertext Transfer Protocol (HTTP) headers, or a combination thereof.

Clause 9. The method of any of clauses 4 to 8, wherein the set of user credentials includes the one or more third credentials.

Clause 10. The method of clause 9, wherein the one or more third credentials include a client certificate, a client certificate private key, a client certificate private key passphrase, or a combination thereof.

Clause 11. The method of any of clauses 1 to 10, wherein the first configuration utilizes less than all user credentials among the set of user credentials.

Clause 12. The method of any of clauses 1 to 11, wherein the automatically and selectively performing comprises: determining that the first attempt is not verified as successful; generating a second configuration associated with a second authentication type of the plurality of authentication types based on the set of user credentials; performing a second attempt to authenticate the web application scanner with the web application based on the second configuration; and verifying whether the second attempt is successful.

Clause 13. The method of any of clauses 1 to 12, wherein the plurality of authentication types include: BASIC/DIGEST Hypertext Transfer Protocol (HTTP) server authentication, or Windows NT Local Area Network (LAN) Manager (NTLM) HTTP server authentication, or Kerberos HTTP server authentication, or login form web application authentication, or cookie web application authentication, or Selenium web application authentication, or application programming interface (API) key web application authentication, or bearer web application authentication, or client certificate authentication, or any combination thereof.

Clause 14. A component of a web application scanner for scanning of a web application, comprising: a memory; and at least one processor communicatively coupled to the memory, the at least one processor configured to: obtain a set of user credentials during a scan configuration session, the set of user credentials associated with a plurality of authentication types; generate a first configuration associated with a first authentication type of the plurality of authentication types based on the set of user credentials; perform a first attempt to authenticate the web application scanner with the web application based on the first configuration; verify whether the first attempt is successful; and automatically and selectively performing a second attempt to authenticate the web application scanner using the set of credentials via a different authentication type based on whether the first attempt is verified as successful.

Clause 15. The component of clause 14, wherein attempts to authentication via the plurality of authentication types are performed in accordance with an authentication type execution order, until authentication is successful or each authentication type is attempted.

Clause 16. The component of clause 15, wherein the authentication type execution order is preconfigured or is manually configured by a user.

Clause 17. The component of any of clauses 14 to 16, wherein the set of user credentials comprises: one or more first credentials associated with a Hypertext Transfer Protocol (HTTP) server authentication mechanism, one or more second credentials associated with a web application authentication mechanism, or one or more third credentials associated with a client certificate authentication mechanism, or a combination thereof.

Clause 18. The component of clause 17, wherein the set of user credentials includes the one or more first credentials.

Clause 19. The component of clause 18, wherein the one or more first credentials include a username, a password, a Kerberos domain, a Key Distribution Center (KDC), or a combination thereof.

Clause 20. The component of any of clauses 17 to 19, wherein the set of user credentials includes the one or more second credentials.

Clause 21. The component of clause 20, wherein the one or more second credentials include a username, a password, a domain, a cookie, an application programming interface (API) key, one or more a Selenium .side file, one or more Hypertext Transfer Protocol (HTTP) headers, or a combination thereof.

Clause 22. The component of any of clauses 17 to 21, wherein the set of user credentials includes the one or more third credentials.

Clause 23. The component of clause 22, wherein the one or more third credentials include a client certificate, a client certificate private key, a client certificate private key passphrase, or a combination thereof.

Clause 24. The component of any of clauses 14 to 23, wherein the first configuration utilizes less than all user credentials among the set of user credentials.

Clause 25. The component of any of clauses 14 to 24, wherein the automatically and selectively performing comprises: determine that the first attempt is not verified as successful; generate a second configuration associated with a second authentication type of the plurality of authentication types based on the set of user credentials; perform a second attempt to authenticate the web application scanner with the web application based on the second configuration; verify whether the second attempt is successful.

Clause 26. The component of any of clauses 14 to 25, wherein the plurality of authentication types include: BASIC/DIGEST Hypertext Transfer Protocol (HTTP) server authentication, or Windows NT Local Area Network (LAN) Manager (NTLM) HTTP server authentication, or Kerberos HTTP server authentication, or login form web application authentication, or cookie web application authentication, or Selenium web application authentication, or programming interface (API) key web application authentication, or web application authentication, or client certificate authentication, or any combination thereof.

Clause 27. A non-transitory computer-readable medium storing computer-executable instructions that, when executed by a component of a web application scanner for scanning of a web application, cause the component to: obtain a set of user credentials during a scan configuration session, the set of user credentials associated with a plurality of authentication types; generate a first configuration associated with a first authentication type of the plurality of authentication types based on the set of user credentials; perform a first attempt to authenticate the web application scanner with the web application based on the first configuration; verify whether the first attempt is successful; and automatically and selectively performing a second attempt to authenticate the web application scanner using the set of credentials via a different authentication type based on whether the first attempt is verified as successful.

Clause 28. The non-transitory computer-readable medium of clause 27, wherein attempts to authentication via the plurality of authentication types are performed in accordance with an authentication type execution order, until authentication is successful or each authentication type is attempted.

Clause 29. The non-transitory computer-readable medium of clause 28, wherein the authentication type execution order is preconfigured or is manually configured by a user.

Clause 30. The non-transitory computer-readable medium of any of clauses 27 to 29, wherein the set of user credentials comprises: one or more first credentials associated with a Hypertext Transfer Protocol (HTTP) server authentication mechanism, one or more second credentials associated with a web application authentication mechanism, or one or more third credentials associated with a client certificate authentication mechanism, or a combination thereof.

Clause 31. The non-transitory computer-readable medium of clause 30, wherein the set of user credentials includes the one or more first credentials.

Clause 32. The non-transitory computer-readable medium of clause 31, wherein the one or more first credentials include a username, a password, a Kerberos domain, a Key Distribution Center (KDC), or a combination thereof.

Clause 33. The non-transitory computer-readable medium of any of clauses 30 to 32, wherein the set of user credentials includes the one or more second credentials.

Clause 34. The non-transitory computer-readable medium of clause 33, wherein the one or more second credentials include a username, a password, a domain, a cookie, an application programming interface (API) key, one or more a Selenium .side file, one or more Hypertext Transfer Protocol (HTTP) headers, or a combination thereof.

Clause 35. The non-transitory computer-readable medium of any of clauses 30 to 34, wherein the set of user credentials includes the one or more third credentials.

Clause 36. The non-transitory computer-readable medium of clause 35, wherein the one or more third credentials include a client certificate, a client certificate private key, a client certificate private key passphrase, or a combination thereof.

Clause 37. The non-transitory computer-readable medium of any of clauses 27 to 36, wherein the first configuration utilizes less than all user credentials among the set of user credentials.

Clause 38. The non-transitory computer-readable medium of any of clauses 27 to 37, wherein the automatically and selectively performing comprises: determine that the first attempt is not verified as successful; generate a second configuration associated with a second authentication type of the plurality of authentication types based on the set of user credentials; perform a second attempt to authenticate the web application scanner with the web application based on the second configuration; verify whether the second attempt is successful.

Clause 39. The non-transitory computer-readable medium of any of clauses 27 to 38, wherein the plurality of authentication types include: BASIC/DIGEST Hypertext Transfer Protocol (HTTP) server authentication, or Windows NT Local Area Network (LAN) Manager (NTLM) HTTP server authentication, or Kerberos HTTP server authentication, or login form web application authentication, or cookie web application authentication, or Selenium web application authentication, or programming interface (API) key web application authentication, or web application authentication, or client certificate authentication, or any combination thereof.

Clause 40. An apparatus comprising means for performing a method according to any of clauses 1 to 13.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of authenticating a web application scanner for scanning of a web application, comprising:
   obtaining a set of user credentials during a scan configuration session, the set of user credentials associated with a plurality of authentication types;
   generating a first configuration associated with a first authentication type of the plurality of authentication types based on the set of user credentials;

performing a first attempt to authenticate the web application scanner with the web application based on the first configuration;
verifying whether the first attempt is successful; and
automatically and selectively performing a second attempt to authenticate the web application scanner using the set of credentials via a different authentication type based on whether the first attempt is verified as successful.

2. The method of claim 1, wherein attempts to authentication via the plurality of authentication types are performed in accordance with an authentication type execution order, until authentication is successful or each authentication type is attempted.

3. The method of claim 2, wherein the authentication type execution order is preconfigured or is manually configured by a user.

4. The method of claim 1, wherein the set of user credentials comprises:
one or more first credentials associated with a Hypertext Transfer Protocol (HTTP) server authentication mechanism,
one or more second credentials associated with a web application authentication mechanism, or
one or more third credentials associated with a client certificate authentication mechanism, or
a combination thereof.

5. The method of claim 4, wherein the set of user credentials includes the one or more first credentials.

6. The method of claim 5, wherein the one or more first credentials include a username, a password, a Kerberos domain, a Key Distribution Center (KDC), or a combination thereof.

7. The method of claim 4, wherein the set of user credentials includes the one or more second credentials.

8. The method of claim 7, wherein the one or more second credentials include a username, a password, a domain, a cookie, an application programming interface (API) key, one or more a Selenium .side file, one or more Hypertext Transfer Protocol (HTTP) headers, or a combination thereof.

9. The method of claim 4, wherein the set of user credentials includes the one or more third credentials.

10. The method of claim 9, wherein the one or more third credentials include a client certificate, a client certificate private key, a client certificate private key passphrase, or a combination thereof.

11. The method of claim 1, wherein the first configuration utilizes less than all user credentials among the set of user credentials.

12. The method of claim 1, wherein the automatically and selectively performing comprises:
determining that the first attempt is not verified as successful;
generating a second configuration associated with a second authentication type of the plurality of authentication types based on the set of user credentials;
performing a second attempt to authenticate the web application scanner with the web application based on the second configuration; and
verifying whether the second attempt is successful.

13. The method of claim 1, wherein the plurality of authentication types include:
BASIC/DIGEST Hypertext Transfer Protocol (HTTP) server authentication, or
Windows NT Local Area Network (LAN) Manager (NTLM) HTTP server authentication, or
Kerberos HTTP server authentication, or
login form web application authentication, or
cookie web application authentication, or
Selenium web application authentication, or
application programming interface (API) key web application authentication, or
bearer web application authentication, or
client certificate authentication, or
any combination thereof.

14. A component of a web application scanner for scanning of a web application, comprising:
a memory; and
at least one processor communicatively coupled to the memory, the at least one processor configured to:
obtain a set of user credentials during a scan configuration session, the set of user credentials associated with a plurality of authentication types;
generate a first configuration associated with a first authentication type of the plurality of authentication types based on the set of user credentials;
perform a first attempt to authenticate the web application scanner with the web application based on the first configuration;
verify whether the first attempt is successful; and
automatically and selectively performing a second attempt to authenticate the web application scanner using the set of credentials via a different authentication type based on whether the first attempt is verified as successful.

15. The component of claim 14, wherein attempts to authentication via the plurality of authentication types are performed in accordance with an authentication type execution order, until authentication is successful or each authentication type is attempted.

16. The component of claim 15, wherein the authentication type execution order is preconfigured or is manually configured by a user.

17. The component of claim 14, wherein the set of user credentials comprises:
one or more first credentials associated with a Hypertext Transfer Protocol (HTTP) server authentication mechanism,
one or more second credentials associated with a web application authentication mechanism, or
one or more third credentials associated with a client certificate authentication mechanism, or
a combination thereof.

18. The component of claim 17, wherein the set of user credentials includes the one or more first credentials.

19. The component of claim 18, wherein the one or more first credentials include a username, a password, a Kerberos domain, a Key Distribution Center (KDC), or a combination thereof.

20. The component of claim 17, wherein the set of user credentials includes the one or more second credentials.

21. The component of claim 20, wherein the one or more second credentials include a username, a password, a domain, a cookie, an application programming interface (API) key, one or more a Selenium .side file, one or more Hypertext Transfer Protocol (HTTP) headers, or a combination thereof.

22. The component of claim 17, wherein the set of user credentials includes the one or more third credentials.

23. The component of claim 22, wherein the one or more third credentials include a client certificate, a client certificate private key, a client certificate private key passphrase, or a combination thereof.

24. The component of claim 14, wherein the first configuration utilizes less than all user credentials among the set of user credentials.

25. The component of claim 14, wherein the automatically and selectively performing comprises:
determine that the first attempt is not verified as successful;
generate a second configuration associated with a second authentication type of the plurality of authentication types based on the set of user credentials;
perform a second attempt to authenticate the web application scanner with the web application based on the second configuration; and
verify whether the second attempt is successful.

26. The component of claim 14, wherein the plurality of authentication types include:
BASIC/DIGEST Hypertext Transfer Protocol (HTTP) server authentication, or
Windows NT Local Area Network (LAN) Manager (NTLM) HTTP server authentication, or
Kerberos HTTP server authentication, or
login form web application authentication, or
cookie web application authentication, or
Selenium web application authentication, or
programming interface (API) key web application authentication, or
web application authentication, or
client certificate authentication, or
any combination thereof.

27. A non-transitory computer-readable medium storing computer-executable instructions that, when executed by a component of a web application scanner for scanning of a web application, cause the component to:
obtain a set of user credentials during a scan configuration session, the set of user credentials associated with a plurality of authentication types;
generate a first configuration associated with a first authentication type of the plurality of authentication types based on the set of user credentials;
perform a first attempt to authenticate the web application scanner with the web application based on the first configuration;
verify whether the first attempt is successful; and
automatically and selectively performing a second attempt to authenticate the web application scanner using the set of credentials via a different authentication type based on whether the first attempt is verified as successful.

28. The non-transitory computer-readable medium of claim 27, wherein attempts to authentication via the plurality of authentication types are performed in accordance with an authentication type execution order, until authentication is successful or each authentication type is attempted.

29. The non-transitory computer-readable medium of claim 28, wherein the authentication type execution order is preconfigured or is manually configured by a user.

30. The non-transitory computer-readable medium of claim 27, wherein the set of user credentials comprises:
one or more first credentials associated with a Hypertext Transfer Protocol (HTTP) server authentication mechanism,
one or more second credentials associated with a web application authentication mechanism, or
one or more third credentials associated with a client certificate authentication mechanism, or
a combination thereof.

31. The non-transitory computer-readable medium of claim 30, wherein the set of user credentials includes the one or more first credentials.

32. The non-transitory computer-readable medium of claim 31, wherein the one or more first credentials include a username, a password, a Kerberos domain, a Key Distribution Center (KDC), or a combination thereof.

33. The non-transitory computer-readable medium of claim 30, wherein the set of user credentials includes the one or more second credentials.

34. The non-transitory computer-readable medium of claim 33, wherein the one or more second credentials include a username, a password, a domain, a cookie, an application programming interface (API) key, one or more a Selenium .side file, one or more Hypertext Transfer Protocol (HTTP) headers, or a combination thereof.

35. The non-transitory computer-readable medium of claim 30, wherein the set of user credentials includes the one or more third credentials.

36. The non-transitory computer-readable medium of claim 35, wherein the one or more third credentials include a client certificate, a client certificate private key, a client certificate private key passphrase, or a combination thereof.

37. The non-transitory computer-readable medium of claim 27, wherein the first configuration utilizes less than all user credentials among the set of user credentials.

38. The non-transitory computer-readable medium of claim 27, wherein the automatically and selectively performing comprises:
determine that the first attempt is not verified as successful;
generate a second configuration associated with a second authentication type of the plurality of authentication types based on the set of user credentials;
perform a second attempt to authenticate the web application scanner with the web application based on the second configuration; and
verify whether the second attempt is successful.

39. The non-transitory computer-readable medium of claim 27, wherein the plurality of authentication types include:
BASIC/DIGEST Hypertext Transfer Protocol (HTTP) server authentication, or
Windows NT Local Area Network (LAN) Manager (NTLM) HTTP server authentication, or
Kerberos HTTP server authentication, or
login form web application authentication, or
cookie web application authentication, or
Selenium web application authentication, or
programming interface (API) key web application authentication, or
web application authentication, or
client certificate authentication, or
any combination thereof.

* * * * *